US010115324B2

(12) United States Patent
Aigner et al.

(10) Patent No.: US 10,115,324 B2
(45) Date of Patent: Oct. 30, 2018

(54) SECURITY LABEL COMPRISING AN AUTHENTICITY AND MANIPULATION DETECTOR

(75) Inventors: Georg Aigner, Pabneukirchen (AT); Johann Hilburger, Pirk (DE)

(73) Assignee: HUECK FOLIEN GES.M.B.H., Baumgartenberg (AT)

( * ) Notice: Subject to any disclaimer, the term of this patent is extended or adjusted under 35 U.S.C. 154(b) by 310 days.

(21) Appl. No.: 13/266,320

(22) PCT Filed: Feb. 8, 2010

(86) PCT No.: PCT/EP2010/000762

§ 371 (c)(1), (2), (4) Date: Jan. 10, 2012

(87) PCT Pub. No.: WO2010/127730

PCT Pub. Date: Nov. 11, 2010

(65) Prior Publication Data

US 2012/0112450 A1 May 10, 2012

(30) Foreign Application Priority Data

May 7, 2009 (EP) .................................... 09006199

(51) Int. Cl.

| | |
|---|---|
| ***B42D 15/00*** | (2006.01) |
| ***B42D 15/10*** | (2006.01) |
| ***G09C 3/00*** | (2006.01) |
| ***G09F 3/00*** | (2006.01) |
| ***G09F 3/10*** | (2006.01) |

(52) U.S. Cl.

CPC .............. *G09F 3/0292* (2013.01); *G09F 3/10* (2013.01)

(58) Field of Classification Search

CPC .......... B42D 15/00; B42D 15/10; G09C 3/00; B32B 9/04; G09F 3/0292; G09F 3/10

USPC ...... 283/72, 74, 81, 82, 83, 91, 94, 98, 101; 428/411.1

See application file for complete search history.

(56) References Cited

U.S. PATENT DOCUMENTS

| | | | | |
|---|---|---|---|---|
| 5,760,961 | A * | 6/1998 | Tompkin | G03H 1/02 283/86 |
| 2001/0041238 | A1* | 11/2001 | Staller | C09J 7/0217 283/81 |
| 2002/0191234 | A1 | 12/2002 | Ishimoto et al. | |
| 2003/0058491 | A1* | 3/2003 | Holmes | B42D 25/324 283/86 |
| 2004/0020086 | A1 | 2/2004 | Hudson | |
| 2004/0239102 | A1* | 12/2004 | Rollain | G09F 3/0289 283/81 |
| 2006/0193021 | A1 | 8/2006 | Ishimoto et al. | |
| 2007/0212506 | A1 | 9/2007 | Adair et al. | |
| 2009/0152861 | A1* | 6/2009 | Kresse | G09F 3/0288 283/81 |
| 2009/0322538 | A1 | 12/2009 | Kobren et al. | |
| 2010/0206953 | A1* | 8/2010 | O'Boyle | B32B 7/12 283/74 |

FOREIGN PATENT DOCUMENTS

| | | |
|---|---|---|
| JP | 6-332379 | 12/1994 |
| JP | 2002-82616 | 3/2002 |
| WO | 01/93231 | 12/2001 |
| WO | 2007/123902 | 11/2007 |

OTHER PUBLICATIONS

International Search Report dated May 25, 2010 in International (PCT) Application No. PCT/EP2010/000762.

* cited by examiner

*Primary Examiner* — Justin V Lewis

(74) *Attorney, Agent, or Firm* — Wenderoth, Lind & Ponack, L.L.P.

(57) ABSTRACT

A security element, in particular for security labels or adhesive strips, includes the following layers: a) a carrier substrate; b) a reflective layer or a layer with a high refractive index; c) a partial separating lacquer layer; and d) an all-over adhesive coating.

16 Claims, No Drawings

SECURITY LABEL COMPRISING AN AUTHENTICITY AND MANIPULATION DETECTOR

The invention relates to a security label or adhesive strip comprising manipulation detection, in which, if the label is detached from the object or package to be secured, a concealed optical element becomes visible.

DE 100 22 002 A1 discloses a security adhesive strip for detecting the unauthorized opening of a package. The multilayer adhesive strip has a carrier based on oriented thermoplastic film, the upper side of which is possibly coated with a separating lacquer and to the underside of which the following layers are applied:

a) a primer layer not applied all over, the primer layer being anchored very well on the thermoplastic film, b) a separating layer applied all over the applied primer layer and the free thermoplastic film surface, wherein the separating layer is anchored better on the primer layer than on the thermoplastic film, and c) a contact adhesive compound applied all over the separating layer, which is anchored better on the separating layer than the separating layer on the thermoplastic film.

Here, a primer layer is applied and then a layer which exhibits no adhesion to the carrier film.

The disadvantage with this structure is that the adhesive strip pulled off is still sticky, since the adhesive layer is located on the surface after the pulling off.

From WO 01/93231 is a security label which has two microstructures, of which one is a diffractive structure which can still be detected in the non-manipulated state and the other is a structure controlling the release. In the event of an attempt at manipulation, at least parts of a reflective layer are detached, which means that a new visually detectable item of information becomes visible.

It was an object of the present invention to provide a security element, in particular a security label, which permits manipulation detection, the security feature being detectable only in the event of manipulation and not being detectable in the non-manipulated state.

Furthermore, the security element is to have a smooth, non-sticky surface on both surfaces in the manipulated state.

The subject matter of the present invention is therefore a security element, in particular a security label, characterized in that it has the following layers:

a) a carrier substrate b) a reflective layer or a layer with a high refractive index c) a partial separating lacquer layer d) an all-over adhesive coating.

If appropriate, one or more further layer(s) with optical, optically active, diffractive, electrically conductive and/or magnetic properties can be situated between the layers a) and b).

If appropriate, an adhesion promoter layer can be situated between the layers c) and d).

Suitable as a carrier substrate are, for example, carrier films, preferably flexible plastic films, for example of PI, PP, MOPP, PE, PPS, PEEK, PEK, PEI, PSU, PAEK, LCP, PEN, PBT, PET, PA, PC, COC, POM, ABS, PVC, fluoropolymers such as Teflon and the like. The carrier films preferably have a thickness of 5-700 μm, preferably 5-200 μm, particularly preferably 5-100 μm.

If appropriate, the carrier substrate can be chemically pretreated or coated. The coating can be an adhesion promoter layer or a release layer.

Furthermore, the carrier substrate can be provided with a lacquer layer which has a diffractive structure.

Here, diffractive structures are understood to mean diffraction structures, surface reliefs, diffraction gratings, holograms, kinegrams and the like.

This lacquer layer can be a radiation-curable lacquer layer or a thermoplastic lacquer layer.

The radiation-curable lacquer can be, for example, a radiation-curable lacquer system based on a polyester system, an epoxy system or a polyurethane system which contains two or more different photo-initiators familiar to those skilled in the art, which are able to initiate curing of the lacquer system to a different extent at different wavelengths. For instance, one photo-initiator can thus be activated at a wavelength of 200 to 400 nm; the second photo-initiator can then be activated at a wavelength of 370 to 600 nm. A sufficient difference should be maintained between the activation wavelengths of the two photo-initiators in order that excessive excitation of the second photo-initiator does not take place while the first photo-initiator is being activated. The range in which the second photo-initiator is excited should lie in the transmission wavelength range of the carrier substrate used. For the main curing (activation of the second photo-initiator), electron radiation can also be used.

A water-dilutable lacquer can also be used as a radiation-curable lacquer. Preference is given to lacquer systems based on polyester.

The surface structure, that is to say the diffraction structure or relief structure, is molded into the radiation-curable lacquer layer, for example, at a controlled temperature by means of a die or by using an embossing mold, said lacquer layer having been pre-cured as far as the gel point by activating the first photo-initiator and being at this stage at the time of the molding.

If a water-dilutable radiation-curable lacquer is used, pre-drying can be carried out first, if appropriate, for example by means of IR emitters.

The thermoplastic lacquer, which is subsequently stabilized, is composed of an MMA base or ethyl cellulose or cycloolefin copolymer, modifiers being added to the base polymer in order to set the required thermoplastic properties or to establish the subsequent ability to be stabilized.

Depending on the base polymer, suitable modifiers are, for example, additives for setting the desired glass temperature, the range in which the lacquer is in the thermoplastic state, or modifiers for achieving permanent curing of the lacquer.

The components are preferably dissolved in a solvent, for example in aqueous solvents, water, alcohols, ethyl acetate, methyl ethyl ketone and the like or mixtures thereof.

A lacquer based on MMA, for example, particularly advantageously has nitrocellulose added in order to increase the glass temperature.

A lacquer based on cycloolefin copolymers, for example, particularly advantageously has polyethylene waxes added.

A lacquer based on ethyl cellulose has commercially available cross-linkers added in order to establish the ability to be cured.

The concentration of the base polymers in the finished lacquer is 4-50%, depending on the base polymers, on the desired properties of the lacquer and on the type and concentration of the modifiers.

The structuring can be carried out by means of a conventional thermal embossing process.

The layer thickness of the lacquer applied can vary, depending on the requirement of the end product and the thickness of the substrate, and is generally between 0.5 and 50 μm, preferably between 2 and 10 μm, particularly preferably between 2 and 5 μm.

A reflective layer or a layer with a high refractive index is subsequently applied. This layer can be applied all over or partially but at least to some extent overlapping with the separating lacquer layer.

Suitable as a reflective layer are, for example, layers of a metal or of an alloy. Suitable as a metal layer are layers of Al, Cu, Fe, Ag, Au, Cr, Ni, Zn and the like. Suitable alloys are, for example, Cu—Al alloys, CU—Zn alloys and the like.

Suitable as a layer with a high refractive index are, for example, layers of metal compounds.

Suitable metal compounds are, for example, oxides or sulfides of metals, in particular $TiO_2$, Cr oxides, ZnS, ITO, ATO, FTO, ZnO, $Al_2O_3$ or silicon oxides.

The thickness of the layer is preferably 10-100 nm, particularly preferably 20-50 nm.

A partial layer of a separating lacquer is then applied. This separating lacquer layer can, if appropriate, be a dyed or pigmented separating lacquer layer.

The separating lacquer layer can have luminescent properties, in particular fluorescent or luminescent properties, electrically conductive properties and/or magnetic properties.

The separating lacquer layer is preferably built up on the basis of aqueous binders or solvent-containing binders.

The separating lacquer layer is preferably applied in the form of characters, symbols, letters, sequences of letters, logos, lines, guilloches and the like.

Then, if appropriate, an all-over adhesion promoter layer is applied to this separating lacquer layer.

Suitable adhesion promoter layers are known compositions based on polyurethane, polyvinyl chloride or acrylates and the copolymers thereof.

An adhesive coating; for example a cold-seal or hot-melt adhesive coating or self-adhesive coating, is applied to this adhesion promoter layer. By using this adhesive coating, the label is fixed to the object to be secured.

This adhesive coating or the adhesion promoter layer migrates under the metallic layer or the layer with a high refractive index at those points at which there is no separating lacquer layer. As a result, the adhesion to the carrier substrate and/or to the layers applied thereto is destroyed.

Once the label having the adhesive coating has been applied to the object to be secured, the partial separating lacquer layer cannot be detected through the metallic layer or the layer with a high refractive index lying above the separating lacquer layer.

When the label is detached, the adhesive coating and/or the adhesion promoter separates the metallization from the carrier substrate in those areas in which there is no separating lacquer layer present. In those areas in which a separating lacquer layer is present, the metallization is not detached from the carrier substrate, rather only the separating lacquer layer, i.e. the structure is split between the layers b) and c).

As a result, the information printed as the separating lacquer layer becomes detectable.

In addition, the surface both of the part of the label that is pulled off and the part of the label that remains on the object to be secured is dry and not sticky.

The security element according to the invention can be applied as a security element to packaging materials or used in tailor-made form as labels in any desired shape (angular, round, oval) or as an adhesive strip for securing objects or packages.

The invention claimed is:

1. A security element for security labels or adhesive strips, the security element comprising:

a carrier substrate;

a reflective layer or a layer with a high refractive index applied on the carrier substrate;

a partial separating lacquer layer applied intermittently on a surface of the reflective layer or the layer with a high refractive index;

an adhesive coating applied to the partial separating lacquer layer; and an adhesion promoter layer situated between the partial separating lacquer layer and the reflective layer or the layer with the high refractive index, wherein the security element is configured to cause the adhesive coating to migrate under the reflective layer or the layer with the high refractive index at portions of the surface of the reflective layer or the layer with the high refractive index on which there is no partial separating lacquer layer due to adhesion of the reflective layer or the layer with the high refractive index to the substrate being destroyed at points where the adhesive coating has migrated under the reflective layer or the layer with the high refractive index.

2. The security element as claimed in claim 1, further comprising a layer having optical, optically active, diffractive, electrically conductive and/or magnetic properties which is arranged between the carrier substrate and the reflective layer or the layer with the high refractive index.

3. The security element as claimed in claim 1, wherein the carrier substrate has a lacquer layer with a diffractive structure.

4. The security element as claimed in claim 1, wherein the partial separating lacquer layer is applied as characters, symbols, letters, sequences of letters, logos, lines, or guilloches.

5. The security element as claimed in claim 1, wherein the partial separating lacquer layer is a dyed or pigmented separating lacquer layer.

6. The security element as claimed in claim 5, wherein the partial separating lacquer layer is a layer with optical, luminescent, electrically conductive and/or magnetic properties.

7. The security element as claimed in claim 1, wherein the reflective layer is a layer of a metal or an alloy.

8. The security element as claimed in claim 1, wherein the layer with a high refractive index is a layer of a metal compound.

9. The security element as claimed in claim 1, wherein the adhesive coating is a hot-melt or cold-seal adhesive coating or a self-adhesive coating.

10. The security element as claimed in claim 2, further comprising an adhesion promoter layer situated between the partial separating lacquer layer and the reflective layer or the layer with the high refractive index.

11. The security element as claimed in claim 10, wherein the carrier substrate has a lacquer layer with a diffractive structure.

12. The security element as claimed in claim 11, wherein the partial separating lacquer layer is applied as characters, symbols, letters, sequences of letters, logos, lines, or guilloches.

13. The security element as claimed in claim 10, wherein the partial separating lacquer layer is applied as characters, symbols, letters, sequences of letters, logos, lines, or guilloches.

14. The security element as claimed in claim 2, wherein the carrier substrate has a lacquer layer with a diffractive structure.

15. The security element as claimed in claim 14, wherein the partial separating lacquer layer is applied as characters, symbols, letters, sequences of letters, logos, lines, or guilloches.

16. The security element as claimed in claim 2, wherein the partial separating lacquer layer is applied as characters, symbols, letters, sequences of letters, logos, lines, or guilloches.

* * * * *